(12) United States Patent
Becker et al.

(10) Patent No.: US 8,291,204 B2
(45) Date of Patent: Oct. 16, 2012

(54) APPARATUS, SYSTEM AND METHOD FOR ALLOWING PRESCRIBED COMPONENTS IN THE SYSTEM TO BE STARTED WITH MINIMAL DELAY

(75) Inventors: Matthias Becker, Korbach (DE); Thomas Göhring, Tiefenort (DE); Karl-Heinz Knobl, Allendorf (DE); Bernd Weymann, Braunfels (DE)

(73) Assignee: Siemens VDO Automotive AG, Regensburg (DE)

( * ) Notice: Subject to any disclaimer, the term of this patent is extended or adjusted under 35 U.S.C. 154(b) by 824 days.

(21) Appl. No.: 12/002,935

(22) Filed: Dec. 19, 2007

(65) Prior Publication Data
US 2008/0154461 A1   Jun. 26, 2008

(30) Foreign Application Priority Data

Dec. 19, 2006 (DE) .................. 10 2006 060 004

(51) Int. Cl.
*G06F 9/00* (2006.01)
*G06F 9/24* (2006.01)
*G06F 15/177* (2006.01)

(52) U.S. Cl. ................... 713/1; 713/2; 713/100

(58) Field of Classification Search .......... 713/1, 2, 713/100
See application file for complete search history.

(56) References Cited

U.S. PATENT DOCUMENTS

| | | | |
|---|---|---|---|
| 6,075,939 A | 6/2000 | Bunnell | |
| 6,564,177 B1* | 5/2003 | Matsunaga | 703/21 |
| 7,231,434 B2* | 6/2007 | Raghunandan | 709/220 |
| 7,735,098 B2* | 6/2010 | Chang | 719/328 |
| 2004/0030882 A1* | 2/2004 | Forman | 713/100 |
| 2004/0165073 A1* | 8/2004 | Hayashi et al. | 348/207.99 |
| 2005/0149938 A1 | 7/2005 | Choi | |
| 2006/0277402 A1 | 12/2006 | Wakabayashi | |
| 2007/0022431 A1* | 1/2007 | Chang | 719/321 |
| 2007/0028085 A1* | 2/2007 | Inohiza | 713/1 |
| 2007/0106772 A1* | 5/2007 | Johnson et al. | 709/223 |
| 2007/0121665 A1* | 5/2007 | Ergan et al. | 370/455 |
| 2007/0144189 A1* | 6/2007 | Ishida et al. | 62/157 |
| 2007/0250692 A1* | 10/2007 | Linn | 713/1 |

OTHER PUBLICATIONS

German Office Action dated Jul. 16, 2007 issued in corresponding application No. 10 2006 060 004.5.53.

* cited by examiner

*Primary Examiner* — Vincent Tran
(74) *Attorney, Agent, or Firm* — Cozen O'Connor

(57) ABSTRACT

A method, apparatus and system are disclosed for allowing prescribed components in the system to be started with minimal delay, wherein a multimedia system for a motor vehicle, which comprises a control unit and a plurality of prescribed components that can be selected and started by a user. The operating programs that are associated with at least one first component are provided with a greater proportion of the total available computational resources required for their execution. As a result, it becomes possible to use the at least one first component quite soon after the start-up phase of the system has begun.

12 Claims, 3 Drawing Sheets

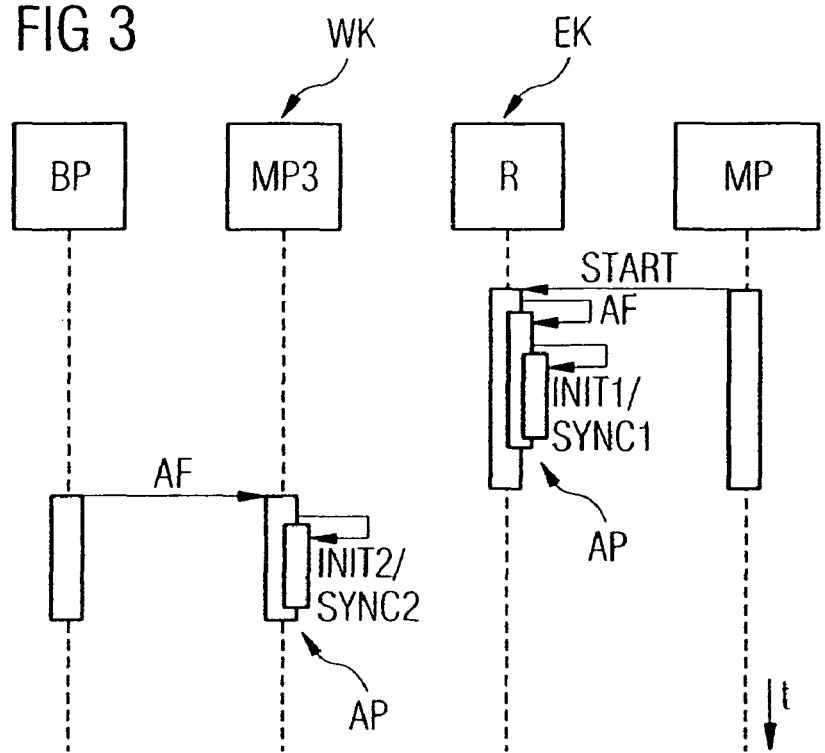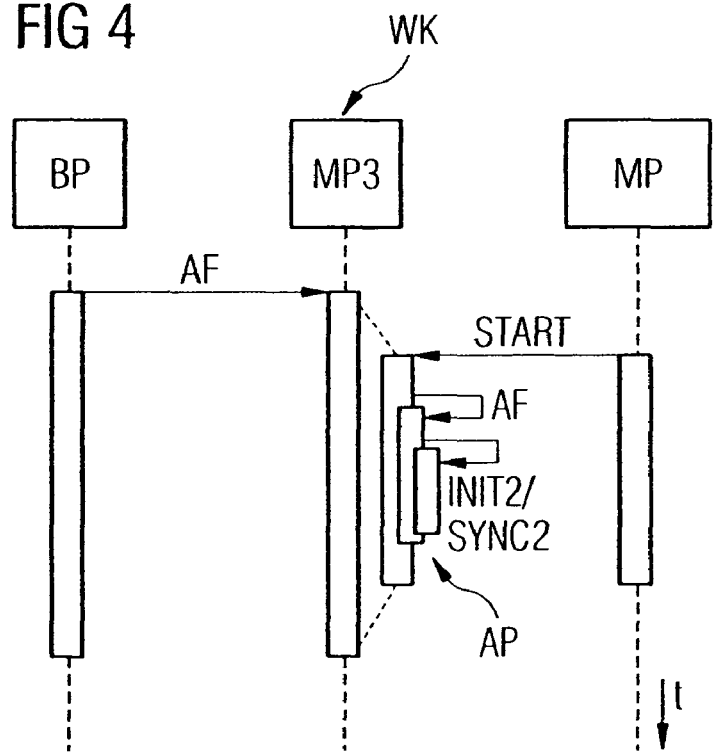

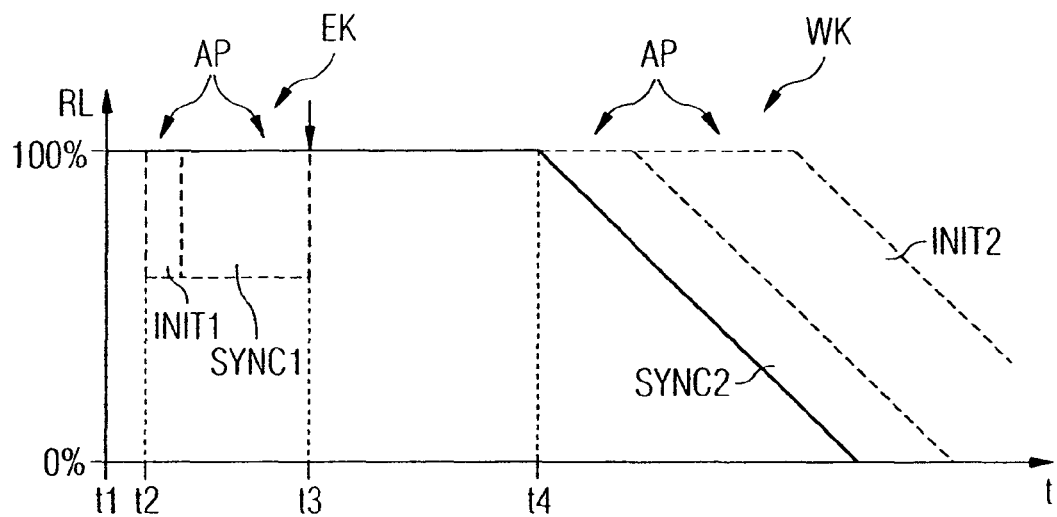
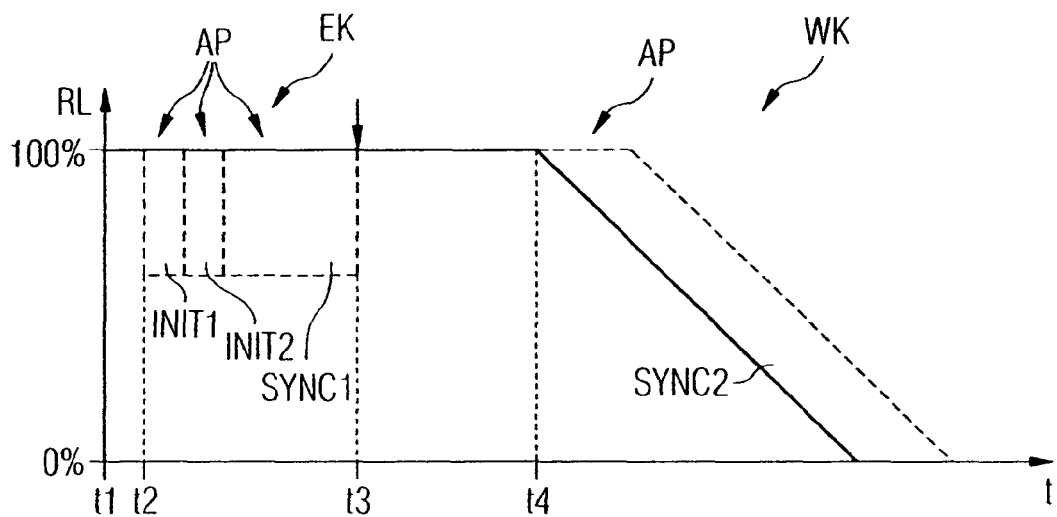

APPARATUS, SYSTEM AND METHOD FOR ALLOWING PRESCRIBED COMPONENTS IN THE SYSTEM TO BE STARTED WITH MINIMAL DELAY

BACKGROUND OF THE INVENTION

1. Field of the Invention

The present invention generally relates to the field of multimedia devices and, more particularly, to an apparatus, system and method for permitting prescribed components in the multimedia system for a motor vehicle to be started with a minimal level of delay.

2. Description of the Related Art

Usually, operating programs which are associated with the prescribed components of a multi-media system of a motor vehicle are either all executed during a start-up phase for the system or execution of the components is delayed until the respective prescribed component is to be used, i.e., when the respective prescribed component is selected and started. However, such a selection sequence causes either the start-up phase of the system to take a particularly long time due to the operating programs that are to be executed for all the prescribed components or in the use of the respective prescribed component being delayed because the operating programs associated with it need to be executed first.

It is therefore apparent there is a need for a system and method that can reduce start-up delays of components in a multi-media system of a motor vehicle.

SUMMARY OF THE INVENTION

A method, apparatus and system are disclosed for allowing prescribed components in the system to be started with minimal delay. In particular, the disclosed invention relates to a multimedia system for a motor vehicle which comprises the apparatus in the form of a control unit and a plurality of prescribed components which can be selected and started by a user. Such prescribed components comprise components such as a radio unit, a CD reproduction unit, a telephone unit or a navigation unit. In accordance with the disclosed invention, each of these prescribed components of such a multimedia system can be selected and started using a common user interface.

The method, the corresponding apparatus and system have at least two prescribed components, where at least one component is designated as a first component that is to be first used after the beginning of the start-up phase for the system. At least one of the at least two prescribed components is designated as an additional component. At least one operating program, which is executed using a first load priority, is associated with the at least one first component, where the at least one operating program needs to be executed before the at least one first component can be used. At least one operating program, which is executed using a second load priority, is associated with the at least one additional component, where the at least one operating program needs to also be executed before the at least one additional component can be used. Here, the second load priority is lower than the first load priority. In addition, the at least one operating program that is associated with the first component is executed before the at least one operating program that is associated with the at least one additional component.

Generally, computational system load is particularly high during the start-up phase of a system. Moreover, in general, at the beginning of the start-up phase, only one or a few of the prescribed components that can potentially be used are actually required to be used in real-time. In particular, the prescribed component that is last used before the current start-up phase of the system is supposed to be reused first, particularly frequently after the system is restarted.

In accordance with the invention, this prescribed component is specifically designated as the first component, for example, which is used after the system is restarted. By executing the operating programs that are associated with the at least one first component with the first load priority, the first component can be used quite early after the beginning of the start-up phase of the system. Two advantages are achieved by executing the operating programs that are associated with the additional components using the second load priority and the accordingly altered distribution of the computation load. First, the computational load on the apparatus or the system is reduced during the start-up phase of the system. Second, the operating programs that are associated with the additional components are executed before the respective additional component is to be used. As a result, the additional component can be used with only a short delay after it has been selected and started at a later time after the start-up phase of the system. Here, execution of the operating programs already being executed is no longer required.

In accordance with the invention, the term "load priority" relates to splitting of the computational resources of a processor or a plurality of processors between various processes that are running more or less in parallel. For example, the operating programs are executed as such processes or by such processes. Here, an operating program with a high load priority is provided with a greater proportion of the computational resources for executing the program than an operating program that has a low load priority. Preferably, the second load priority is set to a low level such that the operating programs can essentially be executed only if the processor with which the respective operating program for execution is associated is not being fully utilized. By providing more than one processor for executing operating programs, it becomes a simple matter to scale the total available computational resources. As a result, it becomes possible to execute two or more operating programs in parallel, for example.

The at least two prescribed components may be hardware and/or software components. Such prescribed components are components such as a radio unit, an MP3 reproduction unit, a CD reproduction unit, a television unit, a telephone unit or a navigation unit in a vehicle. It is contemplated that other prescribed components may be designated. For example, the prescribed components that are designated may alternatively or additionally comprise services provided in a network.

In an embodiment, the at least one additional component is requested. In the event of a request, if the at least one operating program that is associated with the requested component has not already been executed, then a third load priority is used to execute the at least one operating program that is associated with the requested component before the operating programs that are associated with the possibly remaining additional components. Here, the third load priority is higher than the second load priority.

For example, a request of the at least one additional component comprises selecting and starting the respective additional component. Here, the request is made by a user of the apparatus or system, for example, but may also be prompted by the apparatus or by the system. In an embodiment, a telephone unit is requested automatically when a telephone call is received.

One advantage of such a feature is that the operating programs that are associated with the requested component are executed using a high load priority and, therefore, are executed quickly. As a result, it becomes possible to use the requested component after only a short delay, even if the associated operating programs have not yet been executed.

In another advantageous embodiment, the at least one additional component is requested. In the event of a request, the second load priority of the at least one operating program that is associated with the requested component is increased to the third load priority if this at least one operating program is currently being executed.

One advantage of such a feature is the operating programs that are associated with the requested component are executed using a high load priority and, therefore, are executed quickly. As a result, the requested component is used after only a short delay, even when the associated operating programs have not been executed but are currently being executed.

In accordance with the contemplated embodiment, the second load priority is preferably increased to the level of the first load priority, i.e., the third load priority is approximately equal to the first load priority. Alternatively, the third load priority is higher or lower than the first load priority.

In another advantageous embodiment, the operating programs that are associated with the at least one additional component each have a prescribed execution priority that depends on an actual or expected frequency of request for the respective additional component.

For example, the execution priority can be prescribed by an order of the operating programs in which said operating programs are executed. Operating programs from frequently requested additional components are preferably executed before the operating programs from less frequently requested additional components. As a result, a high probability is created of the request for one of the frequently requested additional components involving the associated operating programs already being executed and the requested component being able to be used after a short delay.

In yet another advantageous embodiment, the operating programs comprise loading a configuration for the respective prescribed component and/or checking the presence or the availability and/or a state of the respective prescribed component.

For example, the configuration comprises information concerning what audio amplifier is to be used as an output medium, what volume settings are possible or what connection parameters need to be used, for example, to set up a connection to the prescribed component via a network. For example, the state of the respective component comprises information about currently available stations, tracks or services or the last station, track or service used. Checking the presence or the availability of the respective prescribed component is important, particularly in the case of externally connected prescribed components that may not always be present or available. In addition, however, it is also possible to check whether a particular service that is provided in a network is present or available.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The various features, functions and advantages characterizing the invention will be better understood by reference to the detailed description which follows, taken in conjunction with the accompanying drawings. It should be understood that the drawings are not necessarily drawn to scale and that, unless otherwise indicated, they are merely intended to conceptually illustrate the structures and procedures described herein.

FIG. 3 is a flow chart illustrating the steps of the method in accordance with the invention;

FIG. 4 is a flow chart illustrating the steps in accordance with an additional aspect of the method of the invention;

FIG. 5 is a graphical plot of a first computation load/time illustrating an execution order of operating programs of the exemplary multimedia system for the motor vehicle of FIG. 1; and FIG. 6 is an graphical plot of a second computation load/time illustrating an execution order of the exemplary multimedia system for the motor vehicle of FIG. 1.

DETAILED DESCRIPTION OF THE EXEMPLARY EMBODIMENT

A method, apparatus, system are disclosed for allowing prescribed components in the system to be started with minimal delay. In particular, the disclosed invention relates to a multimedia system for a motor vehicle which comprises a control unit and a plurality of prescribed components which can be selected and started by a user. Such prescribed components are components such as a radio unit, a CD reproduction unit, a telephone unit or a navigation unit. In accordance with the disclosed invention, each of these prescribed components of such a multimedia system can be selected and started using a common user interface.

Figure 1:
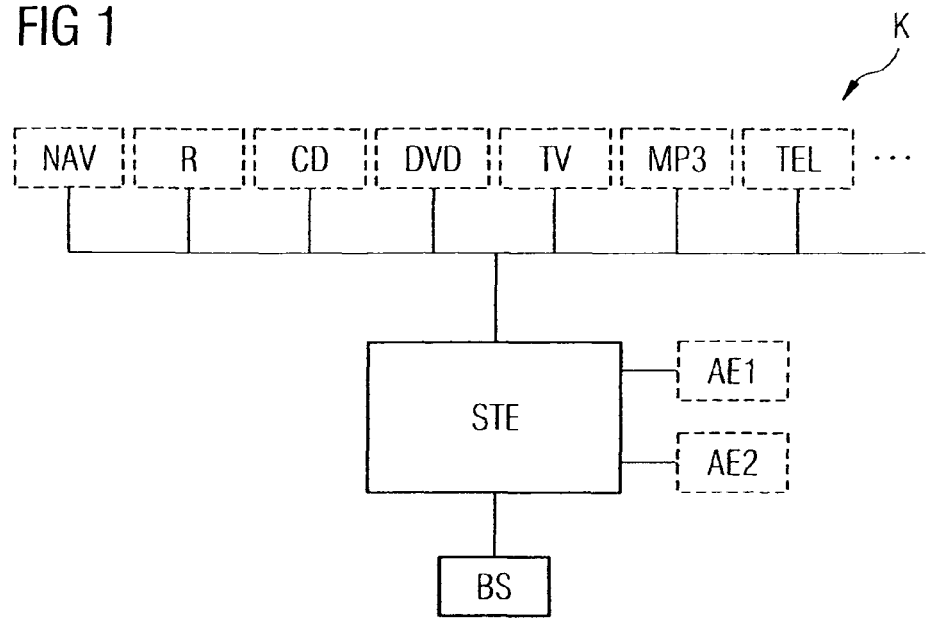
FIG. 1 is an exemplary schematic block diagram of a multimedia system for a motor vehicle.

FIG. 1 is an exemplary schematic block diagram of a multimedia system for a motor vehicle. With reference to FIG. 1, such a system, particularly a multimedia system for a motor vehicle, comprises a control unit STE that forms an apparatus and which is coupled to or comprises a user interface BS. Coupled to the control unit STE is at least two prescribed components K. Here, the at least two prescribed components K comprise components such as a navigation unit NAV, a radio unit R, a CD reproduction unit CD, a DVD reproduction unit DVD, a television unit TV, an MP3 reproduction unit MP3 or a telephone unit TEL. In alternative embodiments, other prescribed components K are provided, such as a camera to assist in performing reversing maneuvers. The prescribed components K are arranged together with the control unit STE in a housing (not shown) or are arranged separately from the control unit STE. For example, the prescribed components K are coupled to the control unit STE by a cable connection or by a radio link. Here, the prescribed components K may also be designed to provide their respective services in a network, such as a wireless local area network (WLAN) or Ethernet network.

In addition, a first output unit AE1 and possibly a second output unit AE2 are preferably provided. However, it is contemplated that additional output units may be provided, and it is not the intention to be limited to embodiments in which only the two illustrated output units are provided. In accordance with the contemplated embodiments, the first, the second and possibly the additional output units comprise a loudspeaker system or a screen unit. The control unit STE is designed to forward audio or video outputs from the prescribed components K to the respective suitable output units or to allow direct supply of the audio or video outputs from the prescribed components K to the respective suitable output units. In alternative embodiments, the control unit STE is designed to configure or designate an association between the respective prescribed component K and one or more output units.

Generally, the system that has the at least two prescribed components K is not required to involve the use of all the prescribed components K in an actual start-up phase for the system. For example, provision may be made for the respective prescribed component K, such as the radio unit R, which is last used before the current beginning of the start-up phase of the system to be first used again after the current beginning of the start-up phase of the system. This prescribed component K, subsequently referred to as first component EK, is meant to be available for use as soon as possible after the system is started, i.e., the radio program can be heard, for example, as soon as possible after the beginning of the start-up phase of the system. In certain embodiments, more than one first component EK provided.

All of the prescribed components K that are not designated as first components EK are subsequently referred to as additional components WK. For example, the additional components WK are requested, i.e., selected and started, by a user after the beginning of the start-up phase of the system. However, the use of the requested additional component WK, such as the MP3 reproduction unit MP3, is ideally intended to be possible without any noticeable delay, i.e., a waiting period from the request for the additional component WK up to the ability to use the further component WK should be as short as possible. For example, the ability to use a prescribed component K begins when the audio output or video output from this prescribed component K begins.

In order to use one of the at least two prescribed components K, it is generally necessary to execute at least one operating program AP that is associated with the respective prescribed component K. Here, an operating program AP comprises, for example, initialization or synchronization of the respective component K, i.e., all preparatory operating steps that are required to use the respective prescribed component K. For example, the initialization comprises checking whether the respective prescribed component K is physically present and/or available in the system. In addition, the initialization comprises loading a configuration. This configuration may comprise information regarding the output unit to be used and/or a possible volume range. In an embodiment, the synchronization comprises providing a track or station list, such as the CDs available from a CD changer with their respective tracks or a list of available or prescribed radio stations or television stations.

In accordance with the disclosed embodiments of the invention, execution of the operating programs AP requires computational resources that need to be provided by one or more processors in the control unit STE in particular. However, the computational load RL is particularly high during the start-up phase of the system.

If all the prescribed components K are initialized and synchronized during the start-up phase of the system, i.e., if the operating programs AP that are associated with the prescribed components K are all executed during the start-up phase of the system, then a period from the beginning of the start-up phase of the system up until it becomes possible to use the at least one first component EK may be very long. The operating programs AP that are associated with the at least one first component EK are therefore preferably executed prior to the operating programs AP that are associated with the at least one additional component WK. Such a function can be achieved because the operating programs AP that are associated with the at least one first component EK are executed before the operating programs AP that are associated with the additional components WK. In addition, the operating programs AP that are associated with the at least one first component EK are executed using a first load priority, which is higher than a second load priority, which is used to execute the operating programs AP that are associated with the additional components WK. As a result, the operating programs AP that are associated with the at least one first component EK are provided with a greater proportion of the total available computational resources required for their execution. Consequently, it becomes possible to use the at least one first component EK quite soon after the beginning of the start-up phase of the system.

In the preferred embodiment, the second load priority is set to such a low level that the operating programs AP that are associated with the additional components WK are essentially executed only if the current computational load RL is lower than 100%. Such a feature advantageously prevents the execution of the operating programs AP that are associated with the further components WK from encumbering, or they only insignificantly encumber, the at least one processor in the control unit STE during the start-up phase of the system.

Figure 2:
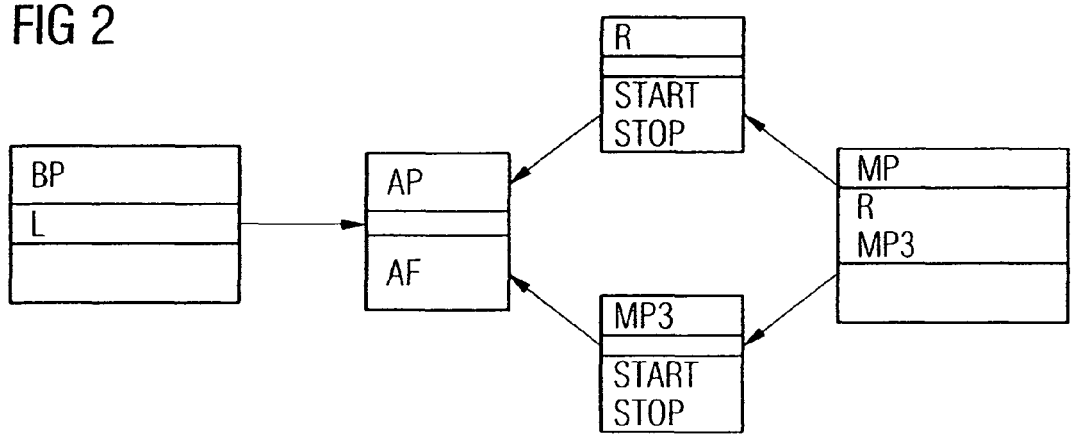
FIG. 2 is a class diagram of the exemplary multimedia system for the motor vehicle of FIG. 1.

FIG. 2 is a class diagram of the exemplary multimedia system for the motor vehicle of FIG. 1. Here, the prescribed components K are each represented by a separate software class. For reasons of clarity, FIG. 2 shows only the classes for the radio unit R and the MP3 reproduction unit MP3. For example, the class of the respective prescribed component K comprises a start function START and a stop function STOP. The start function START and the stop function STOP can be used to start and stop the associated prescribed component K, i.e., start or stop the playback of a radio program or an MP3 file, for example. It should be readily appreciated that other or additional functions may also be provided.

In addition, a main process MP is provided which manages the prescribed components K. In accordance with the disclosed embodiments, the main process MP facilitates user inputs using the user interface BS and controls the prescribed components K by calling the start function START or the stop function STOP. Preferably, the main process MP operates using a high load priority, which in some instances is the same as the first load priority.

The respective prescribed components K have associated operating programs AP. The operating programs AP are respectively represented by a separate class that comprises an execution function AF. Here, executing the execution function AF executes the operating program AP of the respective prescribed component K.

In addition, at least one background process BP is provided that operates using a low load priority that, in some instances, is the same as the second load priority. Preferably, each processor provided in the control unit STE is provided with a background process BP for executing the operating programs AP. The at least one background process BP manages a list L in which it is possible to designate operating programs AP for execution. The at least one background process BP executes the operating programs AP provided in the list L, preferably using the second load priority by calling the execution function AF of the respective operating program AP. In addition, the background process BP preferably executes the operating programs AP prescribed in the list L sequentially in succession. In alternative embodiments, however, the at least one background process BP is in a different form.

Returning to FIG. 2, if the start function START for one of the at least two prescribed components K is called by the main process MP, for example, by virtue of this prescribed component K being requested, then the start function START is preferably executed using the load priority of the main process MP, i.e., preferably using the first load priority. If the operating programs AP required for use of the requested prescribed component K have not been executed by the background process BP, then they are preferably executed using the load priority of the main process MP, i.e., using the first load priority. To this end, the start function START performs the execution functions AF of the operating programs AP associated with the requested prescribed component K. As a result, it becomes advantageously possible to use the requested prescribed component K after only a slight delay with respect to the time of the request.

FIG. 3 is a flow chart illustrating the steps of the method in accordance with the invention. In this example, the radio unit R is designated as a first component and the MP3 reproduction unit MP3 is designated as an additional component. After the start-up phase of the system commences, the first component EK is preferably started by the main process MP by performing the start function START. At this time, however, the operating programs AP required for use of the first component EK have not yet been executed. As a result, the start function START performs the respective execution function AF of the operating programs AP that are associated with the first component EK.

For example, an operating program AP is provided for initializing INIT1 the first component EK and an operating program AP is provided for synchronizing SYNC1 the first component EK. Each of these programs are executed using the first load priority. Here, the first component EK can be used after the operating programs AP that are associated with the first component EK have been executed.

The operating programs AP that are associated with the additional component WK are provided in the list L for the background process BP. These operating programs AP comprise, for example, initialization INIT2 of the additional component WK and synchronization SYNC2 of the additional component WK. Here, the at least one background process BP performs the respective execution function AF of the operating programs AP of the additional component WK and executes them using the second load priority. If the additional component WK, i.e., the MP3 reproduction unit MP3, is requested subsequent to the execution of the associated operating programs AP, i.e., if the start function START of the additional component WK is executed, then the associated operating programs AP are not required to be re-executed. Moreover, the additional component WK can be used after only a slight time delay relative to the time of the request.

FIG. 4 is a flow chart illustrating the steps in accordance with an additional aspect of the method of the invention. With reference to FIG. 4, if the additional component WK is requested during one of the associated operating programs AP that executes at least one background process BP, i.e., if the start function START of the additional component WK is executed by the main process MP, then it is advantageous if the additional execution of the operating programs AP associated with this additional component WK is executed using a third load priority. Here, the third load priority is higher than the second load priority, and is preferably the same as the first load priority. As a result, the currently requested additional component WK can be used after only a slight time delay relative to the time of the request. Such a feature may be achieved, for example, by assigning the higher third load priority to the background process BP and, hence, also to the operating programs AP that are to be executed for the requested designated component K.

FIGS. 5 and 6 are graphical plots of alternative computational load/time graphs showing different orders for the execution of operating programs AP. With specific reference to FIG. 5, a first time t1 represents the beginning of the start-up phase of the system. At a second time t2, the execution of the operating programs AP that are associated with the first component EK begins. These are, in particular, the initialization INIT1 of the first component EK and the synchronization SYNC1 of the first component EK. In certain embodiments, other or additional operating programs AP that are associated with the first component EK are provided, and it is not the intention to be limited to embodiments in which only the single illustrated operating programs is provided. At a third time t3, the execution of the operating programs AP of the first component EK is complete and the first component EK can be used. The start-up phase of the system extends essentially as far as a fourth time t4. From the fourth time t4 onward, the computation load RL drops to below 100%, not including the computation resources that use the operating programs associated with the additional components WK for their execution. Thus, computational resources are available for executing the operating programs AP that are associated with the additional components WK. The execution of the operating programs AP that are associated with the additional components WK thus begins essentially from the fourth time t4 and onward. In particular, the additional components WK are initialized INIT2 and the additional components WK are synchronized SYNC2. It should be appreciated that the order of initialization or synchronization may also be prescribed differently.

With specific reference to FIG. 6, in addition to the first components EK and the first components EK being initialized INIT1 and synchronized SYNC1, the additional components WK are also additionally initialized INIT2 between the second time t2 and the third time t3 by execution of the associated operating programs AP. Here, the initialization INIT1 of the first component EK and the initialization INIT2 of the additional components WK relates particularly to the checking of the physical presence or the availability of the respective prescribed component K in the system. However, other operating programs AP which are associated with the additional components WK and whose execution has timing related to that of the operating programs AP which are associated with the first component EK may also be designated. However, additional operating programs AP which are associated with the additional components WK, i.e., the synchronization SYNC2 of the further components WK in this example, are preferably executed after the fourth time t4 using the low second load priority. In addition, the loading of the configuration of the respective additional component WK, which may be part of the initialization, is preferably also executed as an operating program AP after the fourth time t4 using the low second load priority. Preferably, an order of execution of the operating programs AP which are associated with the additionally components WK is designated, for example, by designating an execution priority for each operating program AP. For example, the order of execution can be designated by the order of the operating programs in the list L for the background process BP. The execution priority is preferably designated based on an actual or expected frequency of request for the respective associated prescribed component K. The execution priority may be firmly designated or may be designated on the basis of a designated by the user or on the basis of the usage patterns. It is also possible for each operating program AP to have an associated identifier that is used to perform the execution prioritization, for example, by the use of operating programs AP having a prescribed first identifier intended to be executed before operating programs AP with a prescribed second identifier. Alternatively, it is possible to designate more than the first and second identifiers.

For a runtime estimate, a number m of prescribed components K and a number $n\_i$ of operating steps for initializing and synchronizing the i-th prescribed component K are assumed. By way of simplification, it is also assumed that the number $n\_i$ of operating steps is the same for all prescribed components K and is the same as the number n of operating steps. It is also assumed that in the manner of the order shown in FIG. 6 for the execution of the operating programs AP, the initialization INIT1 of the first component EK and the initialization INIT2 of the additional components WK comprise a single operational step, such as to check the physical presence or the availability of the respective prescribed component K. The synchronization SYNC1 of the first component EK and the synchronization SYNC2 of the additional components WK then respectively comprise 99 operating steps. The total runtime is the sum of $\Theta(n)$ by the number m of prescribed components K, that is to say $m \cdot \Theta(n)$, where $\Theta(n)$ is a complexity class for the number n of operating steps.

As shown in FIG. 6, if all prescribed components K are initialized between the second and third times t2, t3 and if the first component EK is also synchronized SYNC1 between the second and third times t2, t3, then $m \cdot \Theta(1) + \Theta(n)$ is obtained as an asymptotic runtime estimate for the time period between the second and third times t2, t3. For example, the number m of prescribed components K in the system is ten. In addition, an exemplary time require to execute an operational step is three milliseconds. If all ten prescribed components K were initialized and synchronized between the second and third times t2, t3, the elapsed time would be $m \cdot n \cdot 3$ milliseconds, i.e., three seconds. The start-up phase of the system therefore lasts a very long time. By establishing preference of the first component EK over the additional components WK, the period between the second and third times t2, t3 is merely $m \cdot 3$ milliseconds$+(n-1) \cdot 3$ milliseconds, i.e., 327 milliseconds. Consequently, the start-up phase for the system is therefore shorter.

Thus, while there are shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A method for permitting prescribed components in a multimedia system to be started with a minimal level of delay, the system comprising at least two prescribed components, the method comprising:
    designating at least one of the at least two prescribed components as a first component which is to be used first subsequent to initiation of a start-up phase for the system, and designating at least another of the at least two prescribed components as an additional component prior to the initiation of a start-up phase for the system,
    executing at least one operating program associated with the at least one of the at least two prescribed components having the first component designation using a first load priority, execution of the at least one operating program being required before the at least one of the at least two prescribed components can be used; and
    executing at least one operating program associated with the at least another of the at least two prescribed components having the additional component designation using a second load priority that is lower than the first load priority, execution of the at least one operating program associated with the at least another of the at least two prescribed components being required before the at least another of the at least two prescribed components can be used,
    wherein the at least one operating program associated with the at least one of the at least two prescribed components is executed before the at least one operating program associated with the at least another of the at least two prescribed components,
    wherein the at least two prescribed components of the system are administered by a main process, and a background process with a lower load priority than the main process manages a list designating operating programs of the at least two prescribed components for execution, the background process performing the step of executing the at least one operating program associated with the at least another of the at least two prescribed components having the additional component designation.

2. The method as claimed in claim 1, further comprising the step of requesting operation of a further prescribed component and, if the at least one operating program associated with the requested component has not already been executed, then executing the at least one operating program associated with the requested component using a third load priority that is higher than the second load priority before operating programs associated with any remaining ones of the at least two prescribed components designated as additional components.

3. The method as claimed in claim 2, wherein an execution priority for the operating programs associated with the requested further component is based on one of an actual and expected frequency of request for the requested further component.

4. The method as claimed in claim 1, wherein each of the step of executing the at least one operating program comprises at least one of loading a configuration for the respective one of the at least two prescribed components and checking one of a presence, availability and a state of the respective one of the at least two prescribed components.

5. The method as claimed in claim 1, wherein the step of executing the at least one operating program associated with the at least another of the at least two prescribed components having the additional component designation is performed by the background process only if a current computational load is lower than 100%.

6. The method as claimed in claim 5, wherein the at least one operating program associated with the at least another of the at least two prescribed components having the additional component designation is executed by the main process when required if it has not already been executed by the background process.

7. A method for permitting prescribed components in a multimedia system to be started with a minimal level of delay, the system comprising at least two prescribed components, the method comprising:
    designating at least one of the at least two prescribed components as a first component which is to be used first subsequent to initiation of a start-up phase for the system, and designating at least another of the at least two prescribed components as an additional component,
    executing at least one operating program associated with the at least one of the at least two prescribed components having the first component designation using a first load priority, execution of the at least one operating program being required before the at least one of the at least two prescribed components can be used; and executing at least one operating program associated with the at least another of the at least two prescribed components having the additional component designation using a second load priority that is lower than the first load priority, execution of the at least one operating program associated with the at least another of the at least two prescribed components being required before the at least another of the at least two prescribed components can be used, wherein at least one operating program associated with the at least one of the at least two prescribed components is executed before the at least one operating program associated with the at least another of the at least two prescribed components; and requesting operation of a further prescribed component and, if the at least one operating program associated with the requested component has not already been executed, then executing the at least one operating program associated with the requested component using a third load priority that is higher than the second load priority before operating programs associated with any remaining ones of the at least two prescribed components designated as additional components, and wherein if the at least one operating program associated with the requested further component is currently being executed, then increasing the second load priority of the at least one operating program associated with the requested further component to the third load priority.

8. The method as claimed in claim 7, wherein an execution priority for the operating programs associated with the requested further component is based on one of an actual and expected frequency of request for the requested further component.

9. The method as claimed in claim 7, wherein an execution priority for the operating programs associated with the requested further component is based on one of an actual and expected frequency of request for the requested further component.

10. The method as claimed in claim 7, wherein each of the step of executing the at least one operating program comprises at least one of loading a configuration for the respective one of the at least two prescribed components and checking one of a presence, availability and a state of the respective one of the at least two prescribed components.

11. An apparatus running a program for a start-up phase of a system having at least two prescribed components connected to the apparatus:

wherein the apparatus is configured to:

designate or determine the designation of at least one of the at least two prescribed components as a first component which is to be used first subsequent to initiation of start-up phase for the system, and to designate or determine the designation of at least another of the at least two prescribed components as an additional component prior to the initiation of a start-up phase for the system, execute at least one operating program associated with the at least one of the at least two prescribed components having the first component designation with a first load priority, execution of the at least one operating program being required before the at least one of the at least two prescribed components can be used, execute at least one operating program associated with the at least another of the at least two prescribed components having the additional component designation using a second load priority which is lower than the first load priority, execution of operating program associated with the at least another of the at least two prescribed components being required before the at least another of the at least two prescribed components can be used, and execute the at least one operating program associated with the at least one of the at least two prescribed components before the at least one operating program associated with the at least another of the at least two prescribed components, wherein the at least two prescribed components of the system are administered by a main process, and a background process with a lower load priority than the main process manages a list designating operating programs of the at least two prescribed components for execution, the background process performing the step of executing the at least one operating program associated with the at least another of the at least two prescribed components having the additional component designation.

12. A system comprising:

at least two prescribed components, a control unit configured to designate or determine the designation of at least one of the at least two prescribed components as a first component which is to be used first subsequent to initiation of a start-up phase for the system and another of the at least two prescribed components as an additional component prior to the initiation of a start-up phase for the system, execute at least one operating program associated with the at least one of the at least two prescribed components having the first component designation using a first load priority, execution of the at least one operating program being required before the at least one of the at least two prescribed components can be used, execute at least one operating program associated with the at least another of the at least two prescribed components having the additional component designation using a second load priority, which is lower than the first load priority, execution of the at least one operating program associated with the at least another of the at least two prescribed components being required before the at least another of the at least two prescribed components can be used, and execute the at least one operating program associated with the at least one of the at least two prescribed components before the at least one operating program associated with the at least another of the at least two prescribed components, wherein the at least two prescribed components of the system are administered by a main process, and a background process with a lower load priority than the main process manages a list designating operating programs of the at least two prescribed components for execution, the background process performing the step of executing the at least one operating program associated with the at least another of the at least two prescribed components having the additional component designation.

* * * * *